(12) United States Patent
Wang et al.

(10) Patent No.: US 11,459,259 B2
(45) Date of Patent: Oct. 4, 2022

(54) METHOD FOR REALIZING SLUDGE SAFE DISPOSAL AND RESOURCE RECOVERY THROUGH SLUDGE LIQUEFACTION AND STRATIFICATION

(71) Applicant: SUN YAT-SEN UNIVERSITY, Guangdong (CN)

(72) Inventors: Shanquan Wang, Guangdong (CN); Jiangjian Shi, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 0 days.

(21) Appl. No.: 17/614,383

(22) PCT Filed: Jul. 1, 2020

(86) PCT No.: PCT/CN2020/099623
§ 371 (c)(1),
(2) Date: Nov. 26, 2021

(87) PCT Pub. No.: WO2021/169130
PCT Pub. Date: Sep. 2, 2021

(65) Prior Publication Data
US 2022/0234929 A1 Jul. 28, 2022

(30) Foreign Application Priority Data
Feb. 25, 2020 (CN) .......................... 202010116352.9

(51) Int. Cl.
*C02F 9/00* (2006.01)
*C02F 1/66* (2006.01)
(Continued)

(52) U.S. Cl.
CPC .................. *C02F 9/00* (2013.01); *C02F 1/66* (2013.01); *C02F 11/04* (2013.01); *C02F 11/143* (2019.01);
(Continued)

(58) Field of Classification Search
CPC ....................................................... C02F 9/00
See application file for complete search history.

(56) References Cited

U.S. PATENT DOCUMENTS 5,360,546 A 11/1994 Tomita et al.
2019/0263700 A1* 8/2019 Xu ............................ C11B 1/00

FOREIGN PATENT DOCUMENTS

CN 102702306 10/2012
CN 103172242 6/2013
(Continued)

OTHER PUBLICATIONS

"International Search Report (Form PCT/ISA/210) of PCT/CN2020/099623", dated Nov. 27, 2020, with English translation thereof, pp. 1-6.

(Continued)

*Primary Examiner* — Peter Keyworth
(74) *Attorney, Agent, or Firm* — JCIPRNET

(57) ABSTRACT

The present invention relates to a method for sludge safe disposal and resource recovery through sludge liquefaction and stratification. The method is to completely liquefy the organic matters in the sludge into soluble organic matters through a thermal-alkaline synergistic treatment. After the treatment, the sludge is stratified, and an anaerobic digestion is performed on a high-concentration soluble liquid of an upper layer to convert organic carbon, nitrogen and phosphorus into biogas, ammonia nitrogen and phosphate, a crude protein recovery is performed on a sludge protein of a middle layer, and a dewatering and a landfill on a sludge inorganic solid of a lower layer.

7 Claims, 2 Drawing Sheets

(51) Int. Cl.
    *C02F 11/04*    (2006.01)
    *C02F 101/38*   (2006.01)
    *C02F 1/00*     (2006.01)
    *C02F 101/10*   (2006.01)
    *C02F 11/143*   (2019.01)

(52) U.S. Cl.
    CPC .. *C02F 2001/007* (2013.01); *C02F 2101/105* (2013.01); *C02F 2101/38* (2013.01)

(56) References Cited

FOREIGN PATENT DOCUMENTS

| | | |
|---|---|---|
| CN | 103626365 | 3/2014 |
| CN | 103693828 | 4/2014 |
| CN | 105174668 | 12/2015 |
| CN | 206666345 | 11/2017 |
| CN | 108191192 | 6/2018 |
| CN | 108423957 | 8/2018 |
| CN | 111233292 | 6/2020 |

OTHER PUBLICATIONS

Shanquan Wang et al., "Development of an alkaline/acid pretreatment and anaerobic digestion (APAD) process for methane generation from waste activated sludge," Science of the Total Environment, Sep. 2019, pp. 1-10.

\* cited by examiner

METHOD FOR REALIZING SLUDGE SAFE DISPOSAL AND RESOURCE RECOVERY THROUGH SLUDGE LIQUEFACTION AND STRATIFICATION

CROSS-REFERENCE TO RELATED APPLICATION

This application is a 371 of international application of PCT application serial no. PCT/CN2020/099623, filed on Jul. 1, 2020, which claims the priority benefit of China application no. 202010116352.9, filed on Feb. 25, 2020. The entirety of each of the above mentioned patent applications is hereby incorporated by reference herein and made a part of this specification.

BACKGROUND

Technical Field

The present invention relates to the technical field of sludge treatment, and specifically relates to a method for realizing sludge safe disposal and resource recovery through sludge liquefaction and stratification.

Description of Related Art

Main components of waste activated sludge are organic matters, nitrogen and phosphorus and other nutrients, pathogenic microorganisms of pathogenic bacteria and parasite eggs, which have a high environmental risk and will destroy ecological environment and endanger human health if arbitrarily discharged without stabilization.

In a process of sewage treatment, waste activated sludge treatment and disposal has always been a big problem, causing great troubles to sewage treatment units. It is predicted that China's waste activated sludge production will reach 83.82 million tons in 2020, so the waste activated sludge must be treated and disposed of to achieve a goal of reduction, stabilization, harmlessness, and resource utilization.

At present, treatment methods for waste activated sludge mainly include anaerobic digestion, sludge incineration, sanitary landfill, and sludge dewatering. Among them, the incineration method has a small processing capacity, and the sanitary landfill method and the sludge dewatering method do not have a sufficient stabilization, all of which are not suitable for a large-scale promotion. In the traditional anaerobic digestion method, a volume loading is mostly below 0.5 kgCOD $m^{-3}$ $d^{-1}$, a sludge retention time is often as long as 30 days, and a removal rate of organic matters in the sludge is only about 50% (Shanquan Wang, et al. Development of an alkaline/acid pre-treatment and anaerobic digestion (APAD) process for methane generation from waste activated sludge[J]. Science of the Total Environment, 2020(708)), and thus conventional sludge treatment equipment is extremely large. In addition, a main resource recovered from the waste activated sludge treatment is biogas, while high value added nitrogen and phosphorus elements contained in the waste activated sludge are rarely recovered.

Therefore, for the waste activated sludge treatment, there is an urgent need for a set of methods that can greatly improve an efficiency of the treatment, reduce treatment time and a volume of the treatment equipment, and at the same time recover resources and energy in the waste activated sludge as much as possible.

SUMMARY

The technical problem to be solved by the present invention is to overcome the problems of long time-consuming, large equipment, complicated operation and management and low resource recovery in the existing sludge treatment technology. The present invention provides a method for completely liquefying and stratifying the sludge, and then respectively performing resource recovery and safe disposal on substances of each layer. Organic matters in the sludge are completely liquefied into soluble organic matters through a thermal-alkaline synergistic treatment. After the treatment, the sludge is stratified, and an anaerobic digestion is performed on a high-concentration soluble liquid of an upper layer to produce biogas, a crude protein recovery on a sludge protein of a middle layer, and a dewatering and a landfill on a sludge inorganic solid of a lower layer, respectively. The method of the present invention greatly improves an efficiency of sludge treatment, reduces a volume of sludge treatment equipment, realizes safe disposal of the sludge, and at the same time solves the problem of ammonia inhibition during sludge anaerobic digestion, and greatly recovers carbon, nitrogen and phosphorus resources in the sludge, which is suitable for a large-scale promotion.

Therefore, the first objective of the present invention is to provide a method for sludge safe disposal and resource recovery through sludge liquefaction and stratification.

Another objective of the present invention is to provide an application of the above method in waste activated sludge rapid treatment and resource recovery.

Another yet objective of the present invention is to provide a waste activated sludge treatment system.

In order to achieve the above objectives, the present invention is achieved through the following solutions.

The present invention provides a method for realizing sludge safe disposal and resource recovery through sludge liquefaction and stratification, which specifically includes the following steps:

S1. concentrating a waste activated sludge to obtain a concentrated sludge;

S2. performing a thermal-alkaline synergistic liquefaction treatment on the concentrated sludge obtained in step S1;

S3. adjusting pH value of the sludge after the liquefaction treatment in step S2 to be neutral, and then performing a natural sedimentation to obtain substances of three layers consisting of an upper layer, a middle layer and a lower layer;

S4. performing an anaerobic digestion on the substances of the upper layer obtained in step S3, collecting generated biogas, and then adding $MgCl_2$ into a liquid obtained from the anaerobic digestion treatment to react and obtain a struvite sediment;

S5. performing a separation and a sedimentation on the substances of the middle layer obtained in step S3 to obtain a crude protein; and S6. performing a dewatering and a landfill disposal on the substances of the lower layer obtained in step S3.

The method of the present invention for the safe disposal and resource recovery of the waste activated sludge is completely liquefying organic matters in the sludge into soluble organic matters through the thermal-alkaline synergistic treatment, stratifying the sludge after the treatment, and performing the anaerobic digestion on the high-concentration soluble liquid of the upper layer to produce biogas, the crude protein recovery on the sludge protein of the middle layer, and the dewatering and landfill on the sludge inorganic solid of the lower layer, respectively. The present invention has creatively discovered in the research on the waste activated sludge treatment that the thermal-alkaline combined liquefaction treatment step of the present invention mainly opens the complex structure of microbial cells and their extracellular polymeric substances in solid phase, releasing organic matters, protein, organic phosphorus, etc. in cytoplasm and extracellular proteins into a liquid phase, which can release more than 95% of the organic matters in the sludge into the liquid phase as soluble organic matters within 70 min; and after the treatment, the sludge undergoes a natural sedimentation and is divided into three layers of "a high-concentration organic liquid of an upper layer, a creamy yellow sludge protein of a middle layer and a sludge inorganic solid of a lower layer"; the anaerobic digestion performed on the high-concentration organic liquid of the upper layer can convert organic carbon, nitrogen and phosphorus thereinto into biogas, ammonia nitrogen and phosphate, and can convert more than 88% of the organic matters into biogas within 30 h, greatly improving an efficiency of waste activated sludge treatment. By adding $MgCl_2$, nitrogen and phosphorus resources are recovered in a form of struvite, and a volume loading of an anaerobic digestion reactor can reach 12 kg $m^{-3}$ $d^{-1}$; main substances of the middle layer are proteins released by cell lysis, which can be directly precipitated and recovered, solving the problem of ammonia nitrogen inhibition generated from sludge anaerobic digestion; the lower layer sludge is completely composed of the inorganic solids, and is directly dewatered and landfill disposed. The method of the present invention greatly improves the efficiency of sludge treatment, reduces a volume of sludge treatment equipment, realizes safe disposal of the sludge, and at the same time solves the problem of ammonia inhibition during sludge anaerobic digestion, and greatly recovers carbon, nitrogen and phosphorus resources in the sludge, which is suitable for a large-scale promotion.

Preferably, a total suspended solids content of the concentrated sludge in step S1 is 20 to 60 g/L.

Most preferably, the total suspended solids content of the concentrated sludge in step S1 is 30 g/L.

Preferably, a method of the thermal-alkaline synergistic liquefaction treatment in step S2 is adding NaOH into the concentrated sludge to react under a heating condition.

More preferably, a reaction time of the thermal-alkaline synergistic liquefaction treatment is 60 to 90 min; and a reaction temperature is 140 to 170° C.

Most preferably, the reaction time of the thermal-alkaline synergistic liquefaction treatment is 70 min; and the reaction temperature is 170° C.

Preferably, a dosage ratio of the NaOH to the concentrated sludge is 50 mmol:1 kg to 200 mmol:1 kg.

Most preferably, the dosage ratio of the NaOH to the concentrated sludge is 100 mmol:1 kg.

Preferably, the anaerobic digestion treatment in step S4 is adding the substances of the upper layer into an anaerobic digestion reactor to react.

More preferably, the anaerobic digestion treatment in step S4 is adding the substances of the upper layer into an up-flow anaerobic sludge bed reactor to react.

Preferably, a reaction temperature of the up-flow anaerobic sludge bed reactor is 35° C., a hydraulic retention time is 24 to 48 h, and a volume loading is 10 to 15 kg COD/($m^3 \cdot d$).

Most preferably, the reaction temperature of the up-flow anaerobic sludge bed reactor is 35° C., the hydraulic retention time is 30 h, and the volume loading is 12 kg COD/($m^3 \cdot d$).

Preferably, in step S4, a molar ratio of the $MgCl_2$ to a phosphate contained in the liquid phase is 1:1 to 1.1:1.

Most preferably, in step S4, the molar ratio of the added $MgCl_2$ to the phosphate contained in the liquid phase is 1.02:1.

Preferably, the separation and the sedimentation in step S5 are performing a separation and a sedimentation by adjusting pH value of the substances of the middle layer obtained in step S3 to 6.5 to 8.

In addition, an application of the above method in waste activated sludge rapid treatment and resource recovery is also within the protection scope of the present invention. Using the method of the present invention can realize waste activated sludge rapid treatment and resource recovery and efficiently recover carbon, nitrogen and phosphorus resources in the waste activated sludge.

The present invention further claims a waste activated sludge treatment system, which includes a sludge liquefaction device, a salt producing acid and alkali device, a sedimentation device, an anaerobic digestion reactor, a magnesium adding agitation tank, a struvite sedimentation tank, and a crude protein purification sedimentation tank; the sludge liquefaction device includes a heating component and an agitation component, used to perform a thermal-alkaline synergistic liquefaction on the waste activated sludge; the salt producing acid and alkali device is used to produce acid and alkali respectively, an alkali producing area of the salt producing acid and alkali device is connected with the sludge liquefaction device, used to add alkali to the sludge liquefaction device, and an acid producing area of the salt producing acid and alkali device is connected with an outlet of the sludge liquefaction device, used to adjust pH value of the sludge after the liquefaction treatment; the sedimentation device is connected with the outlet of the sludge liquefaction device, used to perform a static sedimentation on the sludge after pH neutralization; an upper area of the sedimentation device is connected with the anaerobic digestion reactor, used to perform an anaerobic digestion on the substances of the upper layer after the static sedimentation; a middle area is connected to the crude protein purification sedimentation tank, used to perform a separation and a sedimentation on the substances of the middle layer after the static sedimentation to obtain a crude protein; a lower area is connected to an external transport device, used to perform a dewatering and a landfill disposal on the substances of the lower layer; the anaerobic digestion reactor is further connected to the magnesium adding agitation tank, used to perform a magnesium adding treatment on a liquid obtained after the anaerobic digestion treatment; the magnesium adding agitation tank is connected to the struvite sedimentation tank, used to perform a sedimentation on the liquid after the magnesium adding treatment to obtain a struvite sediment.

Compared with the prior art, the present invention has the following beneficial effects.

1. The present invention realizes separate treatment through sludge liquefaction and stratification, which can greatly avoid ammonia nitrogen inhibition and greatly improve the efficiency of carbon, nitrogen and phosphorus resource recovery and safe disposal in the waste activated sludge. The pretreatment step designed by the present invention can release more than 95% of the organic matters in the sludge into the liquid phase within 70 min, and the subsequent liquid phase anaerobic digestion reaction can convert more than 88% of the organic matters into biogas within 30 h, with a volume loading exceeding 10 kg COD/($m^3 \cdot d$). Compared with the traditional anaerobic digestion sludge treatment technology, a processing time per unit volume of sludge is greatly shortened, which is only less than 10% of that of the traditional method, and a volume loading is increased by more than 20 times.

2. The present invention can greatly reduce the volume of sludge treatment equipment. Compared with the traditional anaerobic digestion sludge treatment technology, the volume of the equipment is reduced to about 1/20 of that of the original equipment.

3. The present invention can recover high-value resource materials such as nitrogen, phosphorus and crude protein, and clean energy biogas. The entire operating system of the present invention can recover 93.1% of phosphorus and 80% of nitrogen in the sludge. Compared with the traditional anaerobic digestion technology, a biogas yield is increased by more than 20 times.

4. Compared with the traditional anaerobic digestion sludge treatment technology, the present invention recovers protein resources by recovering the sludge protein of the middle layer after the sludge stratification, and at the same time completely solves the problem of high ammonia nitrogen inhibition during the ordinary sludge anaerobic digestion process.

5. Compared with the traditional anaerobic digestion sludge treatment technology, the present invention can greatly promote a dewatering performance of the sludge.

6. The method of the present invention is simple and easy to master, does not increase a difficulty of sludge treatment operation, and the treatment efficiency is obviously improved, which is suitable for the large-scale promotion.

DESCRIPTION OF THE EMBODIMENTS

The present invention will be further described below with reference to the accompanying drawings and specific embodiments, but the embodiments do not limit the present invention in any form. Unless otherwise specified, the reagents, methods and equipment used in the present invention are conventional reagents, methods and equipment in the technical field.

Unless otherwise specified, the reagents and materials used in the following embodiments are all commercially available.

Embodiment 1: waste activated sludge rapid treatment and resource recovery

1. Experimental Method

Figure 1:
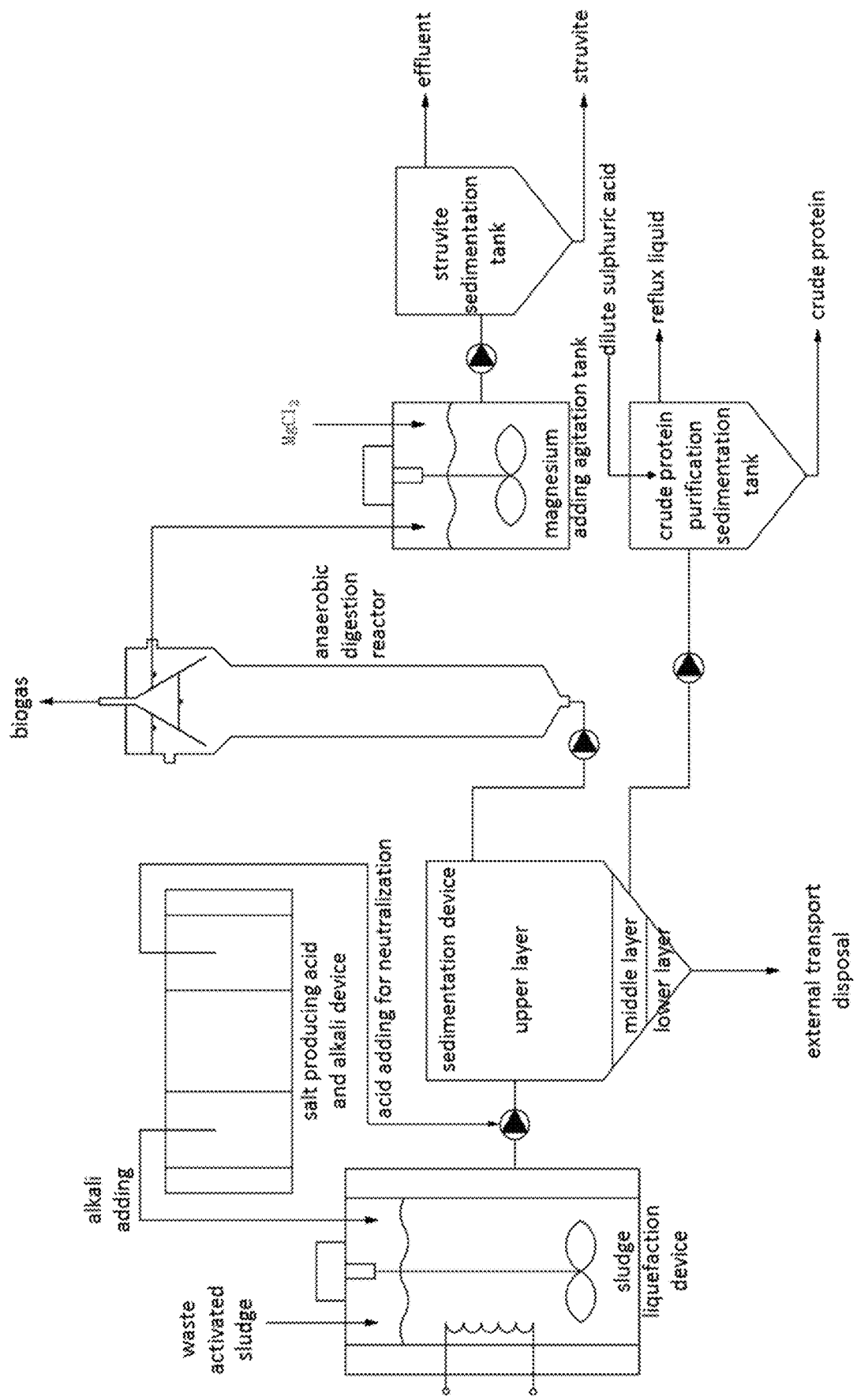
FIG. 1 is a flow chart of the waste activated sludge treatment in the present invention.

As shown in FIG. 1, it is a flow chart of the method for waste activated sludge rapid treatment and resource recovery in the present invention. The specific steps are as follows.

Figure 2:
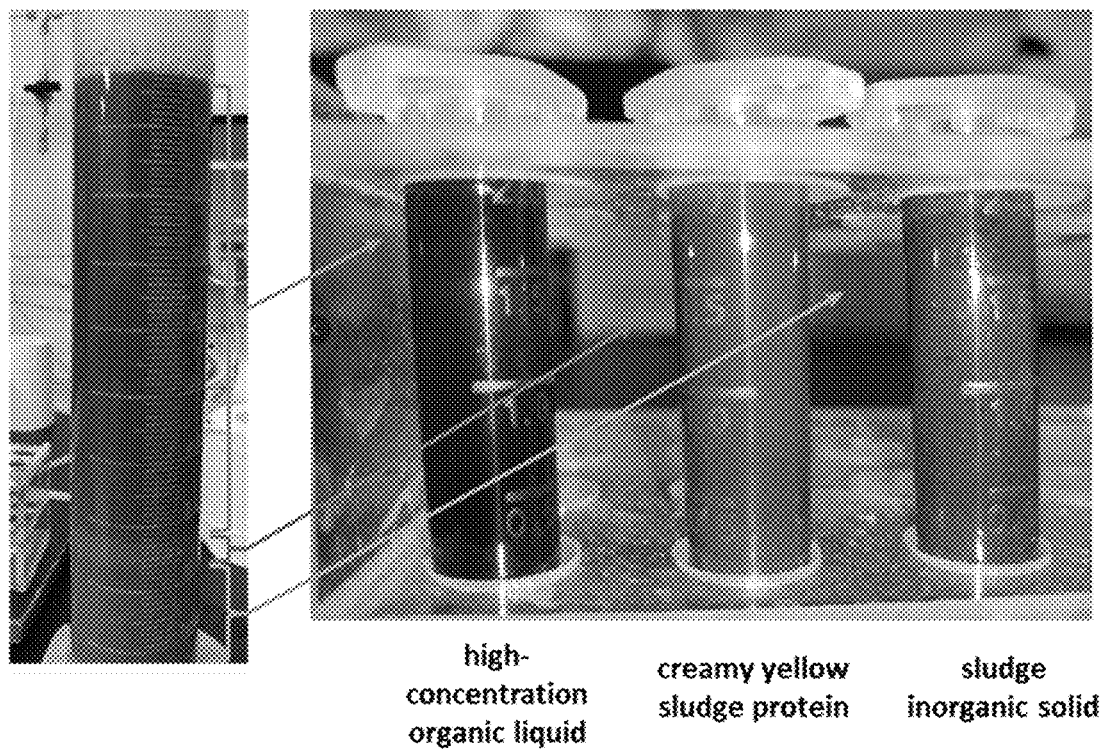
FIG. 2 is a picture of sludge stratification after the liquefaction treatment of the waste activated sludge in the present invention.

(1) The waste activated sludge was concentrated to obtain a concentrated sludge with a total suspended solids content of 30 g/L;

(2) According to a ratio of 100 mmol:1 kg concentrated sludge, NaOH was added into the concentrated sludge for a thermal-alkaline synergistic liquefaction treatment, which was reacted for 70 min at 170° C.; hydrochloric acid was added to adjust a pH value of the sludge after the liquefaction treatment to be neutral;

(3) A static natural sedimentation was performed on the mixture obtained in step (2) and substances of three layers i.e. a high-concentration organic liquid of an upper layer, a creamy yellow sludge protein of a middle layer, and a sludge inorganic solid of a lower layer as shown in FIG. 2 were obtained;

(4) The high-concentration organic liquid of the upper layer in step (3) was added into an anaerobic digestion reactor for an anaerobic digestion treatment, the anaerobic digestion reactor was set with an operating temperature of 35° C. and a retention time of 30 h, with a volume loading of 12 kg COD/($m^3$·d), and three phases of solid, liquid and gas phases were obtained.

(5) Biogas obtained in step (4) was collected, a phosphate content in the liquid phase obtained in step (4) was 22.58 mmol/L, $MgCl_2$ was added at a concentration of 23 mmol/L, and a struvite was precipitated and obtained after the reaction;

(6) A pH value of a liquid of the middle layer obtained in step (3) was adjusted to 6.5, and a crude protein was collected and obtained after a separation and a sedimentation;

(7) The substances of the lower layer obtained in step (3) were dewatered using a plate-and-frame filter press to a moisture content of 60%, and then landfill disposed.

2. Experimental Results (1) In the liquefaction treatment of this embodiment, 80% of the organic matters in the sludge can be released into the liquid phase within 70 min.

(2) In this embodiment, by the anaerobic digestion reaction in the liquid phase of the upper layer, 88% of the organic matters can be degraded within 30 h.

(3) In this embodiment, 80% of the crude protein in the liquid phase of the middle layer can be recovered.

(4) In this embodiment, a recovery amount of the struvite is 5421 mg/L sludge, and thus 93.1% of phosphorus and 80% of nitrogen in the sludge can be recovered.

(5) A biogas yield is 6 $m^3$ biogas/($m^3$-reactor·day).

(6) Compared with the traditional anaerobic digestion sludge treatment technology, a volume of sludge treatment equipment in this embodiment is reduced to 1/20 of that of traditional anaerobic digestion sludge treatment equipment.

COMPARATIVE EXAMPLE 1

Traditional Anaerobic Digestion Sludge Treatment Technology

1. Experimental Method

The specific operation includes the following steps:

(1) According to a ratio of 100 mmol:1 kg concentrated sludge, NaOH was added into the concentrated sludge for a pretreatment, which was reacted for 70 min at 170° C.;

(2) The pretreated sludge obtained in step (1) was added into a solid-liquid mixing anaerobic reactor to react, the anaerobic digestion reactor was set with an operating temperature of 35° C. and a retention time of 30 d, with a volume loading of 0.5 kg COD/($m^3$·d), and generated biogas was collected.

2. Experimental Results (1) In this comparative example, by the anaerobic digestion reaction in the liquid phase, 70% of the organic matters can be degraded within 30 days.

(2) According to the method of this comparative example, a final biogas yield is 0.3 $m^3$ biogas/($m^3$-reactor·day).

Embodiment 2: waste activated sludge rapid treatment and resource recovery

1. Experimental Method (1) The waste activated sludge was concentrated to obtain a concentrated sludge with a TSS content of 60 g/L;

(2) According to a ratio of 50 mmol:1 kg concentrated sludge, NaOH was added into the concentrated sludge for a liquefaction treatment, which was reacted for 70 min at 170° C.; hydrochloric acid was added to adjust pH value of the sludge after the liquefaction treatment to be neutral;

(3) A static natural sedimentation was performed on the mixture in step (2) and substances of three layers consisting of an upper layer, a middle layer and a lower layer were obtained;

(4) The substances of the upper layer obtained in step (3) were added to a up-flow anaerobic sludge bed reactor for an anaerobic digestion treatment, the anaerobic digestion reactor was set with an operating temperature of 30° C. and a retention time of 48 h, with a volume loading of 12 kg COD/($m^3 \cdot d$), and three phases of solid, liquid and gas phases were obtained;

(5) Biogas obtained in step (4) was collected, a phosphate content in the liquid phase obtained in step (4) was 22.58 mmol/L, $MgCl_2$ was added at a concentration of 23 mmol/L, and a struvite was precipitated and obtained after the reaction;

(6) A pH value of a liquid of the middle layer obtained in step (3) was adjusted to 7, and a crude protein was collected and obtained after a separation and a sedimentation;

(7) The substances of the lower layer obtained in step (3) were dewatered using a plate-and-frame filter press to a moisture content of 60%, and then landfill disposed.

2. Experimental Results (1) In the liquefaction treatment of this embodiment, 70% of the organic matters in the sludge can be released into the liquid phase within 70 min.

(2) In this embodiment, by the anaerobic digestion reaction in the liquid phase, 88% of the organic matters can be degraded within 30 h.

(3) In this embodiment, a recovery amount of the struvite is 6777 mg/L sludge, and thus 68.6% of phosphorus and 55% of nitrogen in the sludge can be recovered.

(4) In this embodiment, a final biogas yield is 6 $m^3$ biogas/($m^3$-reactor·day).

For the concentrated sludge with a TSS content of 60 g/L, if treated with the traditional anaerobic digestion method, it is difficult to ensure a uniformity of the reaction system, and it is difficult for the reactor to operate continuously and stably.

Embodiment 3: Waste Activated Sludge Rapid Treatment and Resource Recovery

1. Experimental Method (1) The waste activated sludge was concentrated to obtain a concentrated sludge with a total suspended solids content of 30 g/L;

(2) According to a ratio of 100 mmol:1 kg concentrated sludge, NaOH was added into the concentrated sludge for a liquefaction treatment, which was reacted for 70 min at 140° C.; hydrochloric acid was added to adjust pH value of the sludge after the liquefaction treatment to be neutral;

(3) A static natural sedimentation was performed on the mixture in step (2) and substances of three layers consisting of an upper layer, a middle layer and a lower layer were obtained;

(4) The liquid phase of the upper layer in step (3) was added to an up-flow anaerobic sludge bed reactor for an anaerobic digestion treatment, the anaerobic digestion reactor was set with an operating temperature of 40° C. and a retention time of 24 h, with a volume loading of 10.5 kg COD/($m^3 \cdot d$), and three phases of solid, liquid and gas phases were obtained.

(5) Biogas obtained in step (4) was collected, a phosphate content in the liquid phase obtained in step (4) was 19.75 mmol/L, $MgCl_2$ was added at a concentration of 19.75 mmol/L, and a struvite was precipitated and obtained after the reaction;

(6) A pH value of a liquid of the middle layer obtained in step (3) was adjusted to 8, and a crude protein was collected and obtained after a separation and a sedimentation;

(7) The substances of the lower layer obtained in step (3) were dewatered using a plate-and-frame filter press to a moisture content of 60%, and then landfill disposed.

2. Experimental Results (1) In the liquefaction treatment of this embodiment, 83% of the organic matters in the sludge can be released into the liquid phase within 70 min.

(2) In this embodiment, by the anaerobic digestion reaction in the liquid phase, 85% of the organic matters can be degraded within 30 h.

(3) According to the method of this embodiment, a recovery amount of the struvite is 3680 mg/L sludge, and thus 81.3% of phosphorus and 70% of nitrogen in the sludge can be recovered.

(4) According to the method of this embodiment, a final biogas yield is 5 $m^3$ biogas/($m^3$-reactor·day).

COMPARATIVE EXAMPLE 2

Traditional Anaerobic Digestion Sludge Treatment Technology

1. Experimental method (1) According to a ratio of 100 mmol:1 kg concentrated sludge, NaOH was added into the concentrated sludge for a pretreatment, which was reacted for 70 min at 140° C.;

(2) The pretreated sludge obtained in step (1) was added into a solid-liquid mixing anaerobic reactor to react, the anaerobic digestion reactor was set with an operating temperature of 40° C. and a retention time of 30 d, with a volume loading of 0.4 kg COD/($m^3 \cdot d$), and generated biogas was collected.

2. Experimental Results (1) According to the method of this comparative example, by performing the anaerobic digestion reaction in the liquid phase, 70% of the organic matters can be degraded within 30 days. (2) According to the method of this comparative example, a final biogas yield is 0.2 $m^3$ biogas/($m^3$-reactor·day).

Embodiment 4: Waste Activated Sludge Rapid Treatment and Resource Recovery

1. Experimental Method (1) The waste activated sludge was concentrated to obtain a concentrated sludge with a total suspended solids content of 30 g/L;

(2) According to a ratio of 200 mmol:1 kg concentrated sludge, NaOH was added into the concentrated sludge for a liquefaction treatment, which was reacted for 70 min at 170° C.; hydrochloric acid was added to adjust pH value of the sludge after the liquefaction treatment to be neutral;

(3) A static natural sedimentation was performed on the mixture in step (2) and substances of three layers consisting of an upper layer, a middle layer and a lower layer were obtained;

(4) The liquid phase of the upper layer in step (3) was added to an up-flow anaerobic sludge bed reactor for an anaerobic digestion treatment, the anaerobic digestion reactor was set with an operating temperature of 35° C. and a retention time of 30 h, with a volume loading of 12.3 kg COD/(m$^3$·d), and three phases of solid, liquid and gas phases were obtained.

(5) Biogas obtained in step (4) was collected, a phosphate content in the liquid phase obtained in step (4) was 23.1 mmol/L, MgCl$_2$ was added at a concentration of 25.5 mmol/L, and a struvite was precipitated and obtained after the reaction;

(6) A pH value of a liquid of the middle layer obtained in step (3) was adjusted to 8, and a crude protein was collected and obtained after a separation and a sedimentation;

(7) The substances of the lower layer obtained in step (3) were dewatered using a plate-and-frame filter press to a moisture content of 60%, and then landfill disposed.

2. Experimental Results (1) In the liquefaction treatment of this embodiment, 97% of the organic matters in the sludge can be released into the liquid phase within 70 min.

(2) In this embodiment, by the anaerobic digestion reaction in the liquid phase, 86% of the organic matters can be degraded within 30 h.

(3) In this embodiment, a recovery amount of the struvite is 5557 mg/L sludge, and thus 95% of phosphorus and 70% of nitrogen in the sludge can be recovered.

(4) A biogas yield is 6.1 m$^3$ biogas/(m$^3$-reactor·day).

COMPARATIVE EXAMPLE 3

Traditional Anaerobic Digestion Sludge Treatment Technology

1. Experimental method (1) According to a ratio of 200 mmol:1 kg concentrated sludge, NaOH was added into the concentrated sludge for a pretreatment, which was reacted for 70 min at 170° C.;

(2) The pretreated sludge obtained in step (1) was added into a solid-liquid mixing anaerobic reactor to react, the anaerobic digestion reactor was set with an operating temperature of 35° C. and a retention time of 30 d, with a volume loading of 0.52 kg COD/(m$^3$·d), and generated biogas was collected.

2. Experimental Results (1) According to the method of this comparative example, by performing the anaerobic digestion reaction in the liquid phase, 70% of the organic matters can be degraded within 30 days.

(2) A biogas yield is 0.31 m$^3$ biogas/(m$^3$-reactor·day).

Obviously, the above-mentioned embodiments of the present invention are merely examples to clearly illustrate the present invention, and are not intended to limit the implementations of the present invention. For those of ordinary skill in the art, other changes or modifications in different forms can be made on the basis of the above description. It is not necessary and impossible to list all the implementations here. Any modification, equivalent replacement and improvement made within the spirit and principle of the present invention shall be included in the protection scope of the claims of the present invention.

What is claimed is:

1. A method for realizing sludge safe disposal and resource recovery through sludge liquefaction and stratification, comprising the following steps:

step S1. concentrating a waste activated sludge to obtain a concentrated sludge;

step S2. performing a thermal-alkaline synergistic liquefaction treatment on the concentrated sludge obtained in the step S1;

step S3. adjusting pH value of the sludge after the liquefaction treatment in the step S2 to be neutral, and then performing a natural sedimentation to obtain substances of three layers consisting of an upper layer, a middle layer and a lower layer;

step S4. performing an anaerobic digestion on the substances of the upper layer obtained in the step S3, collecting generated biogas, and then adding MgCl$_2$ into a liquid obtained from the anaerobic digestion treatment to react and obtain a struvite sediment;

step S5. performing a separation and a sedimentation on the substances of the middle layer obtained in the step S3 to obtain a crude protein; and step S6. performing a dewatering and a landfill disposal on the substances of the lower layer obtained in the step S3, wherein a total suspended solids content of the concentrated sludge in the step S1 is 20 to 60 g/L, wherein a method of the thermal-alkaline synergistic liquefaction treatment in the step S2 is adding NaOH into the concentrated sludge to react, with a reaction time being 60 to 90 min and a reaction temperature being 140 to 170° C.

2. The method according to claim 1, wherein a dosage ratio of the NaOH to the concentrated sludge is 50 mmol:1 kg to 200 mmol:1 kg.

3. The method according to claim 1, wherein the anaerobic digestion treatment in the step S4 is adding the substances of the upper layer to an anaerobic digestion reactor for an anaerobic digestion; a reaction temperature of the anaerobic digestion reactor is 30 to 40° C., a hydraulic retention time is 24 to 48 h, and a volume loading is 10 to 15 kg COD/(m$^3$·d).

4. The method according to claim 1, wherein in the step S4, a molar ratio of the MgCl$_2$ to a phosphate contained in the liquid phase is 1:1 to 1.1:1.

5. The method according to claim 1, wherein the separation and the sedimentation in the step S5 are performed by adjusting pH value of the substances of the middle layer obtained in the step S3 to 6.5 to 8.

6. The method according to claim 1, wherein the dewatering in the step S6 is reducing a moisture content of the sludge to below 60%.

7. A waste activated sludge treatment system, comprising a sludge liquefaction device, a salt producing acid and alkali device, a sedimentation device, an anaerobic digestion reactor, a magnesium adding agitation tank, a struvite sedimentation tank, and a crude protein purification sedimentation tank; the sludge liquefaction device comprises a heating component and an agitation component, used to perform a thermal-alkaline synergistic liquefaction on the waste activated sludge; the salt producing acid and alkali device is used to produce acid and alkali respectively, an alkali producing area of the salt producing acid and alkali device is connected with the sludge liquefaction device, used to add alkali to the sludge liquefaction device, and an acid producing area of the salt producing acid and alkali device is connected with an outlet of the sludge liquefaction device, used to adjust pH value of the sludge after the liquefaction treatment; the sedimentation device is connected with the outlet of the sludge liquefaction device, used to perform a static sedimentation on the sludge after pH neutralization; an upper area of the sedimentation device is connected with the anaerobic digestion reactor, used to perform an anaerobic digestion on substances of an upper layer after the static sedimentation; a middle area of the sedimentation device is connected to the crude protein purification sedimentation tank, used to perform a separation and a sedimentation on the substances of a middle layer after the static sedimentation to obtain a crude protein; a lower area of the sedimentation device is connected to an external transport device, used to perform a dewatering and a landfill disposal on the substances of a lower layer; the anaerobic digestion reactor is further connected to the magnesium adding agitation tank, used to perform a magnesium adding treatment on a liquid obtained after the anaerobic digestion treatment; the magnesium adding agitation tank is connected to the struvite sedimentation tank, used to perform a sedimentation on the liquid after the magnesium adding treatment to obtain a struvite sediment.

* * * * *